United States Patent
Allen

(10) Patent No.: US 7,941,679 B2
(45) Date of Patent: May 10, 2011

(54) METHOD FOR COMPUTING POWER SAVINGS AND DETERMINING THE PREFERRED CLOCK GATING CIRCUIT OF AN INTEGRATED CIRCUIT DESIGN

(75) Inventor: David L. Allen, Fremont, CA (US)

(73) Assignee: Atrenta, Inc., San Jose, CA (US)

( * ) Notice: Subject to any disclaimer, the term of this patent is extended or adjusted under 35 U.S.C. 154(b) by 894 days.

(21) Appl. No.: 11/837,174

(22) Filed: Aug. 10, 2007

(65) Prior Publication Data

US 2009/0044033 A1   Feb. 12, 2009

(51) Int. Cl.
 *G06F 1/00* (2006.01)
(52) U.S. Cl. ........................................ 713/300
(58) Field of Classification Search ........ 716/12
 See application file for complete search history.

(56) References Cited

U.S. PATENT DOCUMENTS

| | | | |
|---|---|---|---|
| 5,980,092 A * | 11/1999 | Merryman et al. | 716/6 |
| 6,253,356 B1 * | 6/2001 | Kung | 716/5 |
| 6,810,482 B1 | 10/2004 | Saxena et al. | |
| 6,854,066 B1 * | 2/2005 | LeFevre et al. | 713/340 |
| 7,007,247 B1 | 2/2006 | Wang et al. | |
| 7,051,306 B2 | 5/2006 | Hoberman et al. | |
| 7,076,748 B2 | 7/2006 | Kapoor et al. | |
| 7,080,334 B2 * | 7/2006 | Fan et al. | 716/6 |
| 7,386,776 B2 * | 6/2008 | Arnold et al. | 714/738 |
| 7,392,493 B2 * | 6/2008 | Alpert et al. | 716/114 |
| 2003/0033580 A1 | 2/2003 | Cohn et al. | |
| 2006/0220721 A1 | 10/2006 | Vig et al. | |
| 2007/0011643 A1 | 1/2007 | Wang et al. | |
| 2007/0094623 A1 | 4/2007 | Chen et al. | |
| 2007/0099314 A1 | 5/2007 | Chen et al. | |
| 2008/0005713 A1 * | 1/2008 | Singh et al. | 716/11 |

\* cited by examiner

Primary Examiner — Thomas Lee
Assistant Examiner — Mohammed H Rehman
(74) Attorney, Agent, or Firm — Sughrue Mion, PLLC

(57) ABSTRACT

A method for computing the power savings in an integrated circuit (IC) design is disclosed. The method computes the difference in power savings between techniques used for clock gating. Based on the computation results, the method outputs a script to control the implementation tool so as to provide for the best implementation clock gating technique in terms of power and area savings.

22 Claims, 10 Drawing Sheets

| Rank | Name | Size | Activity | Duty | Savings |
|---|---|---|---|---|---|
| 1 | top.a1 | 800 | 2 | 0.1 | 10mW |
| 2 | top.c2 | 768 | 2 | 0.15 | 9.5mW |
| 3 | top.b1 | 128 | 2 | 0.5 | 0.8mW |
| ... | ... | ... | ... | ... | ... |
| 50 | top.a.x | 32 | 1 | 0.6 | 0.04mW |
| ... | ... | ... | ... | ... | ... |
| 98 | top.b.z | 8 | 2 | 0.9 | 0.004mW |
| 99 | top.c7 | 8 | 2 | 0.95 | -0.001mW |
| 100 | top.d3 | 8 | 2 | 0.98 | -0.002mW |

} Definitely worthwhile
(~20mW / 3 clock gates = 6mw @)

} Might not be worth doing
(~4 mW / 96 clock gates = 0.04mW @)

} Negative savings (increases power)

FIG. 7

METHOD FOR COMPUTING POWER SAVINGS AND DETERMINING THE PREFERRED CLOCK GATING CIRCUIT OF AN INTEGRATED CIRCUIT DESIGN

TECHNICAL FIELD

The present invention relates generally to the design of ICs using a gated clock design technique, and more particularly to the low power IC design.

BACKGROUND OF THE INVENTION

The following documents are incorporated herein by reference, in their entirety, for their useful technical descriptions related to the background explained below: U.S. patent application publication 20030033580 of Maxwell, et al. dated Feb. 13, 2003; U.S. patent application publication 20060220721 of Nitin, et al. dated Oct. 5, 2006; U.S. patent application publication 20070011643 of Qi; et al. dated Jan. 11, 2007; U.S. patent application publication 20070094623 of Haizhou, et al. dated Apr. 26, 2007; U.S. patent application publication 20070099314 of Haizhou, et al. dated May 3, 2007; U.S. Pat. No. 6,810,482 to Saxena, et al. dated Oct. 26, 2004; U.S. Pat. No. 7,007,247 to Wang, et al dated Feb. 28, 2006; U.S. Pat. No. 7,051,306 to Hoberman, et al. dated May 23, 2006; and U.S. Pat. No. 7,076,748 to Kapoor, et al. dated Jul. 11, 2006.

In recent years, the size of integrated circuits (ICs) has dramatically increased in both size and number of transistors, resulting in higher power consumption. In typical IC designs, the clock distribution network, i.e., the clock tree, can consume from twenty to fifty percent of an IC's total active power. One important technique for reducing power consumption in IC designs is to reduce the power of an IC's clock distribution tree by gating portions of the IC that do not need to be clocked under certain conditions.

This process, known as "clock gating", disables the clocks fed to logic blocks of the IC when the logic blocks are not currently enabled or otherwise in active use. Power consumption due to the clocking of logic blocks that are not directly involved with the current operation of the IC is thereby minimized.

FIG. 1 shows a partial logic circuit 100 that has not been clock gated. Circuit 100 includes a synchronous load-enable register 110 implementing the load enabling circuit. The clock input port provides the clock signal "CLK" that clocks the register 110 every cycle. The enable port provides an enable signal "EN" that enables the register 110, thereby allowing data propagation from logic 130 to the output of the register 110. Obviously, there is no need to clock the register 110 every cycle, since the data at the input of register 110 does not change every clock cycle.

FIG. 2A shows a partial logic circuit to which a clock gating technique is applied. An integrated clock gating circuit (ICGC) cell 200 is used as the gating circuit. The ICGC 200 includes an AND gate 205 and a flip-flop 210. The clock and the enable ports are connected to an ICGC 200 as its inputs. When the enable signal is set to a logic value '1', data is input to register 110 synchronously with the clock signal "CLK". On the other hand, when the enable signal is set to a logic value '0', data is not input to register 110 irrespective of the clock signal. Accordingly, when there is no need for loading data to the register 110, unnecessary power consumption can be avoided by outputting the enable signals of a logic zero synchronously with the clock signal.

FIG. 2B shows another technique for clock gating the circuit 100 where a multiplexer (MUX) 220 implements the load enabling. In addition, the output of the register 110 is coupled to one of the inputs of MUX 200. The amount of dynamic power reduction depends upon the technique being implemented, as well as upon several characteristics, such as the enable duty cycle, the bus width and the data activity.

Furthermore, gating all registers in the design increases the size of the IC. As a result, traditional approaches gate all the registers having a size that is greater than a predefined threshold. Alternatively, registers to be clock-gated are manually selected. These approaches are not optimal in terms of power and area cost, as most of the savings can be achieved using only a few clock gating structures.

One solution for selection of the optimal registers to be clock-gated is based on computing the activity savings per each such register. This solution is described in a U.S. patent application Ser. No. 11/419,624 by Kapoor, et al. assigned to common assignee and which is hereby incorporated by reference in its entirety. However, this solution does not compute the power savings for the different clock gating techniques, such as those described above. Furthermore, the computation is limited to clock gates (or "enables") already existing in the design.

It would be therefore advantageous to provide a more efficient approach for computing the power savings of candidate registers for clock gating implementation.

BRIEF DESCRIPTION OF THE DRAWINGS

FIG. 7 is an exemplary power savings report.

DETAILED DESCRIPTION OF THE INVENTION

The present invention includes a method for computing the power savings in clock gating circuits in integrated circuit (IC) design. The method computes the difference in power savings between techniques used for clock gating. Based on the computation results, the method outputs a script to control an implementation tool causing the use of the best implementation clock-gating technique in terms of power and area savings. Trying to compute the power savings manually by a designer is not feasible, as a typical design may include hundreds of candidate clock gating registers.

It will be appreciated that, in the present description, the concept of using "the best" implementation does not mean that the implementation is optimal for every possible criterion. The approach described below allows for the automated selection of an implementation among alternative implementations. It is assumed that the needs of the specific situation facing a person in this field will dictate what is "best". With this in mind, the concept might be restated as that of selecting an implementation on the basis of a particular criterion or of particular criteria. Another way to put this is to say that a preferred alternative is selected. In the description, the criterion is that of the greatest power savings value.

Figure 1:
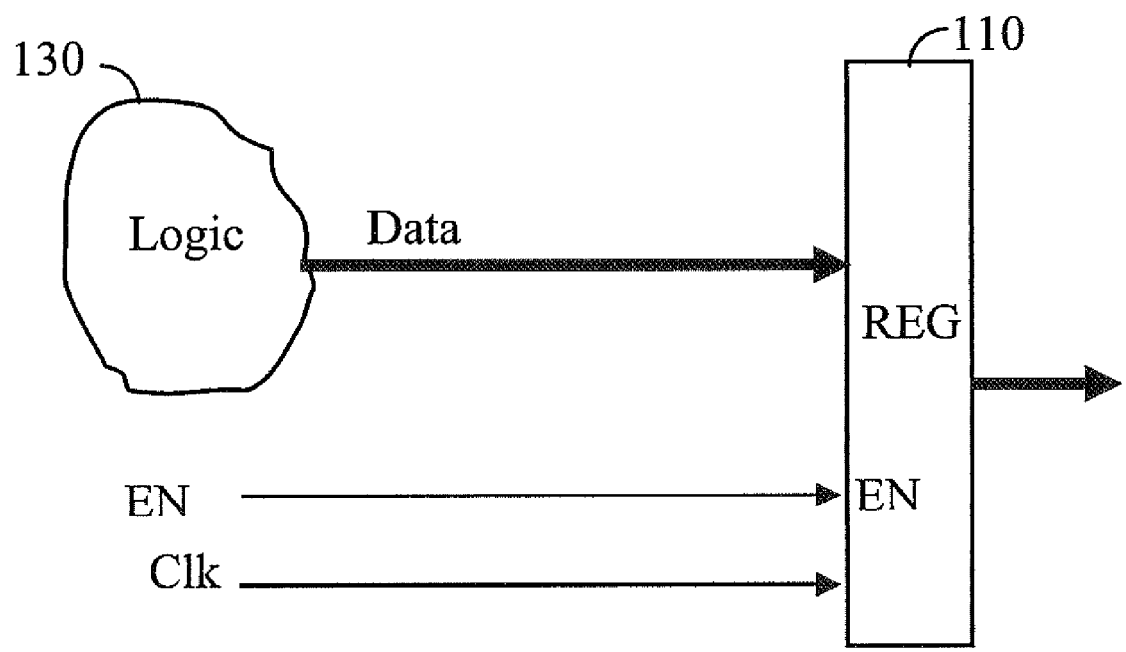
FIG. 1 is a partial logic circuit which has not been clock gated (prior art).
Figure 2A:
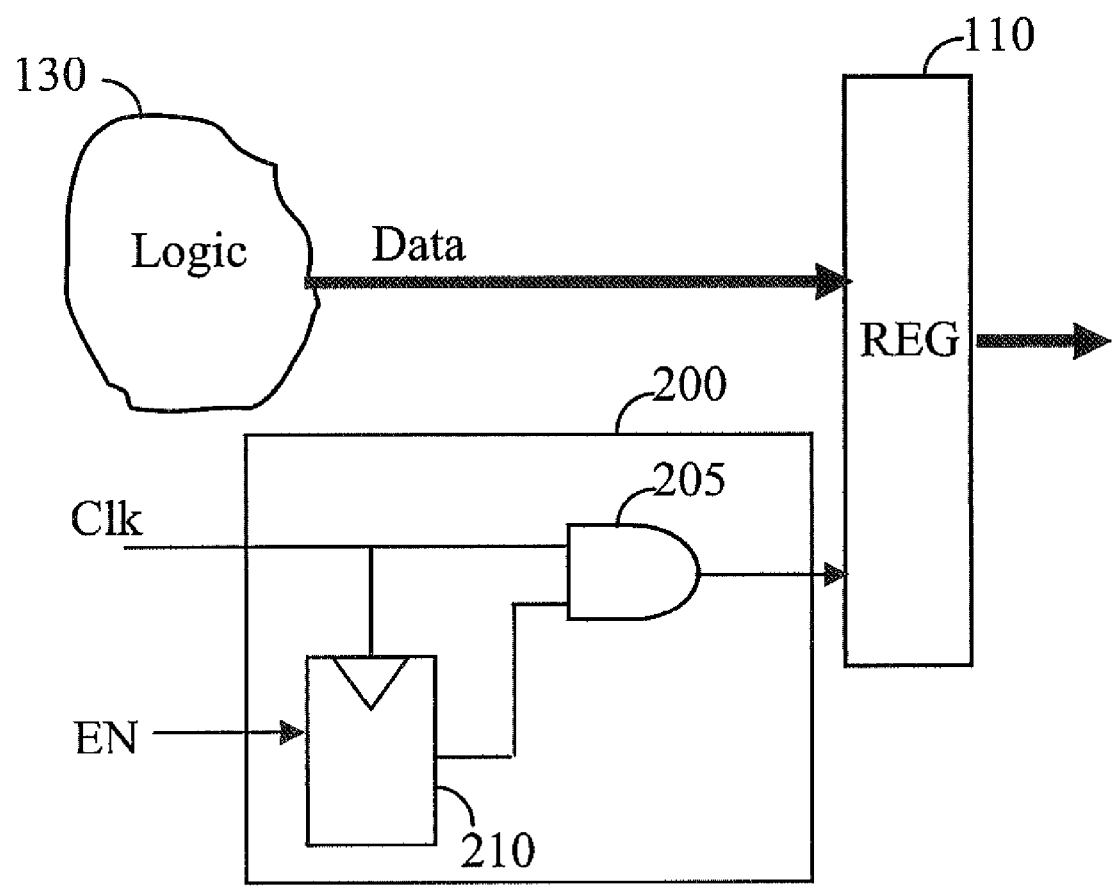
FIGS. 2A and 2B are partial logic circuits to which the clock gating technique is applied (prior art).
Figure 2B:
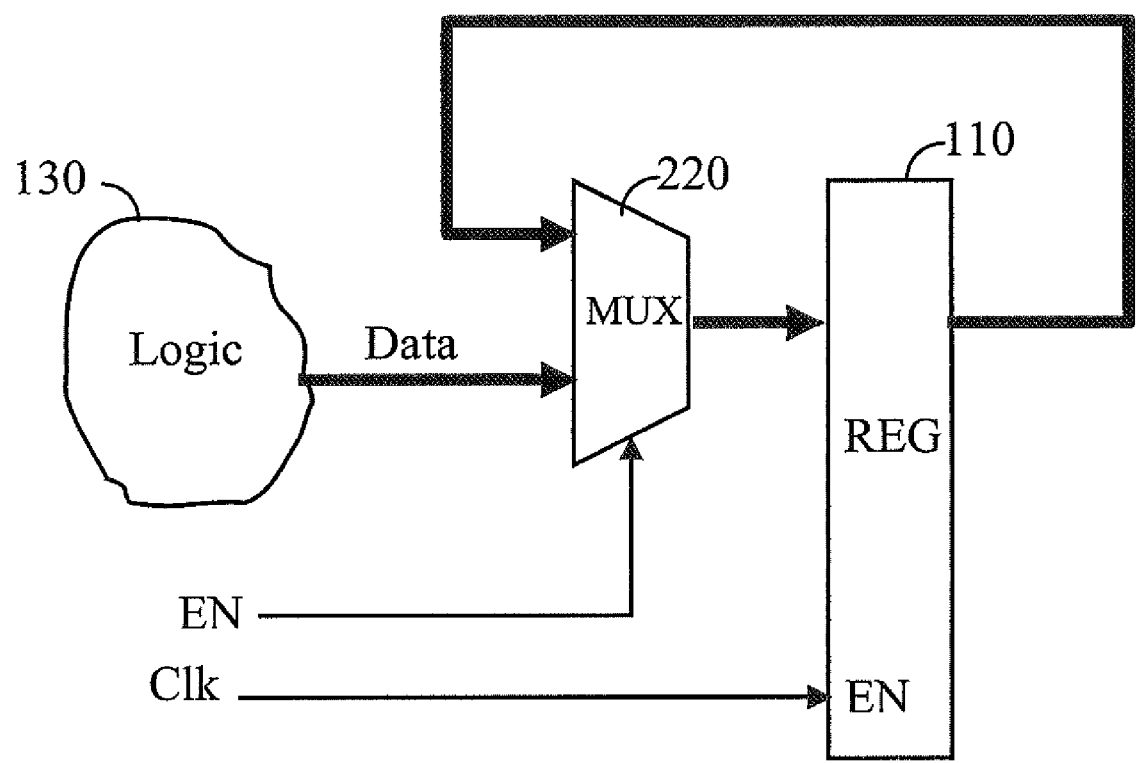
Figure 3:
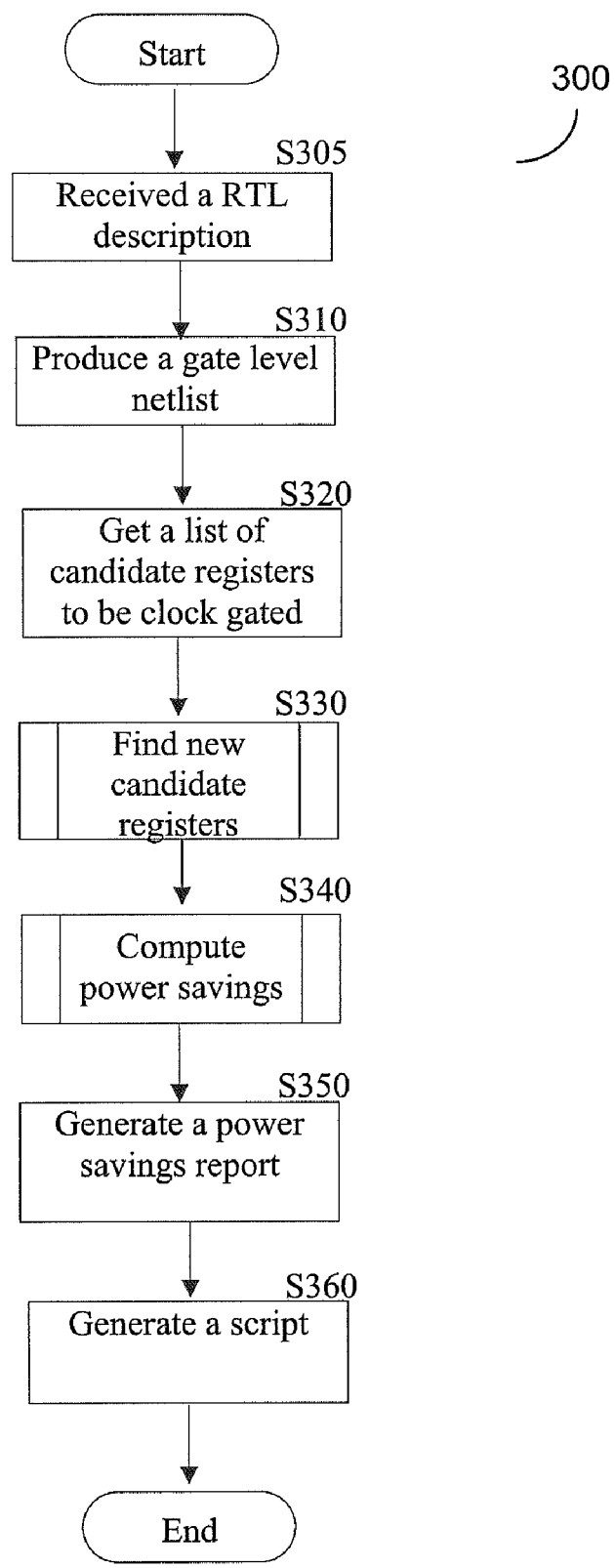
FIG. 3 is a flowchart describing the method for computing the power savings in the design of ICs according to one embodiment of the invention.

FIG. 3 shows a flowchart 300 describing the method, according to one embodiment of the invention, for computing the power savings for clock gating registers in the design of ICs. Although the examples presented herein include only a limited number of gates, this is merely for the purpose of providing a simple explanation of the various embodiments of the invention, unencumbered by unnecessary detail. The examples should not be viewed as limiting the scope of the disclosed invention and it is specifically noted that the methods disclosed herein are operative with respect to designs of ICs that include a large number of logic gates and a large number of time domains.

At S305, a code representing a RTL description of an IC design is received. The code may be written in any hardware description language (HDL) including, but not limited to, Verilog, VHDL and the like. At S310, a synthesized netlist is produced by an IC synthesis tool. Synthesis tools produce a gate level netlist based on a RTL representation. The netlist generally include logical gates such as AND, NAND, NOR, OR, XOR, NXOR, and the likes. One such synthesis tool is described in the US patent entitled "An Apparatus and Method for Handling of Multi-Level Circuit Design Data", U.S. Pat. No. 6,993,733, assigned to common assignee and which is hereby incorporated by reference in its entirety. At S320, a list of candidate registers (hereinafter the "input candidate list") in the design to be clock-gated is received. At S330 a process for detecting new candidate registers in addition to those provided at S320 is executed. Specifically, the process detects registers that can be clock-gated without changing the design functionality, and outputs a complete list of candidate registers to be clock gated (hereinafter the "output candidate list").

Figure 4A:
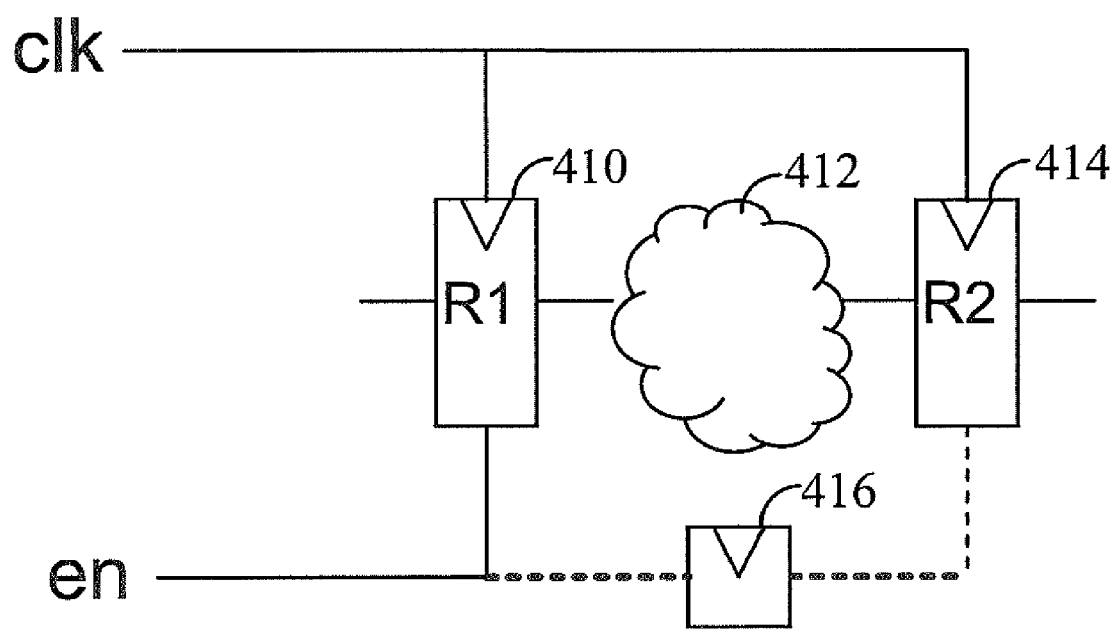
FIGS. 4A, 4B and 4C are partial logic circuits describing the process of identifying registers that are candidates for clock gating.

The present invention is concretely described in terms of several embodiments for detecting new candidate registers (or enables). In one embodiment the process traces forward in combinational logic to detect candidates. As shown in FIG. 4A the process traces forward from an enabled register 410 through a combinatorial logic 412. If another register 414 is detected downstream of the enabled register 410, a new enable can be generated for the register 414 by delaying the enable signal by one clock cycle. In order to delay the enable signal a flip-flop 416 is added to the design. The register 414 is added to the output candidate list. In addition, to allow further traversal forward adding enables to subsequent levels of registers, the register 414 is also added to the input candidate list.

Figure 4B:
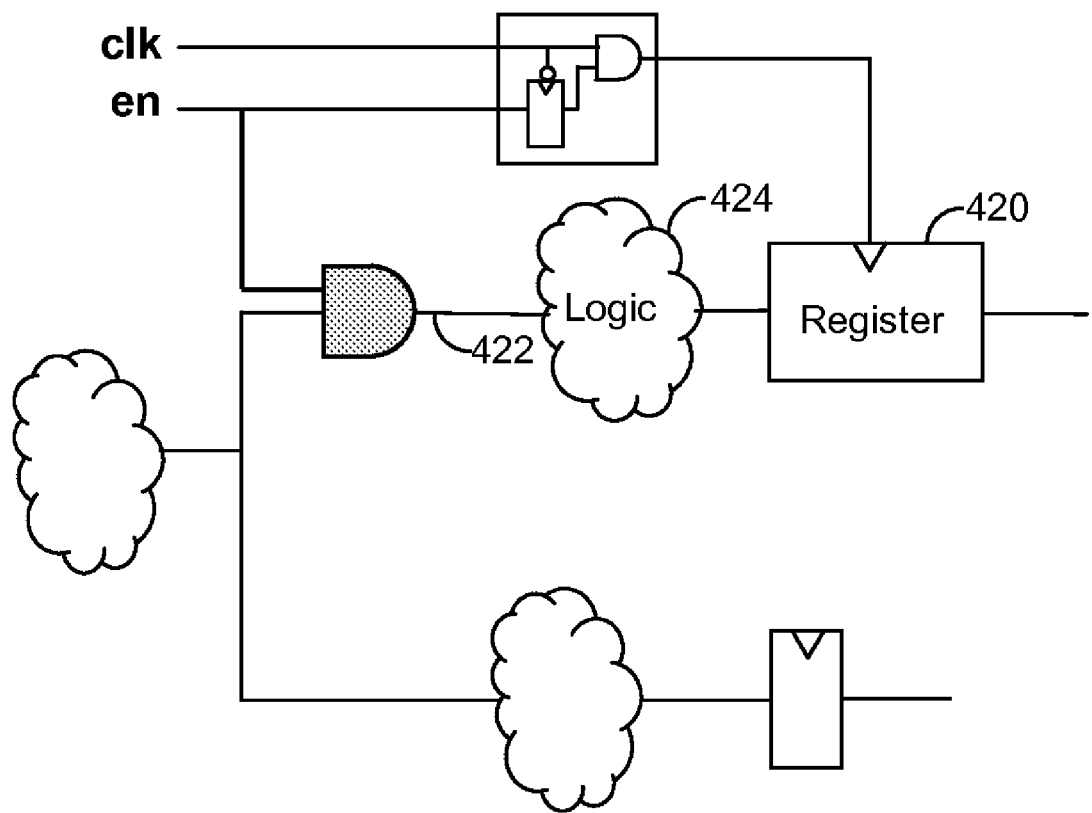

In accordance with another embodiment of the present invention the process traces backward in combinational logic. As shown in FIG. 4B, the process traces backwards from any enabled register 420 to detect the longest path of combinational logic behind the enable point (an input pin) which does not have any external fanout. For example, an input point 422 of a combinatorial logic 424. An AND gate can be inserted at the point 422 to reduce activity within the boundary.

Figure 4C:
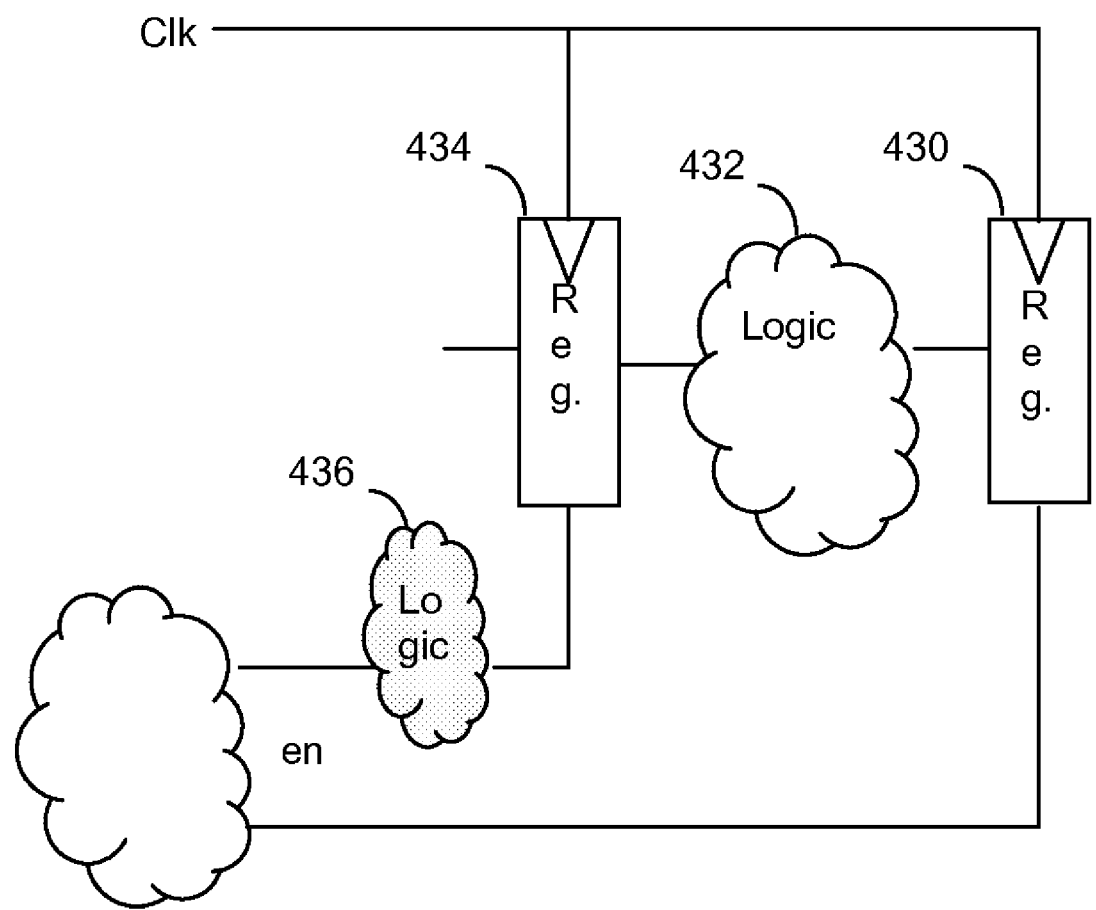

In another embodiment the process traces backwards in a sequential logic to detect new candidates. As illustrated in FIG. 4C, the process traces backwards from a candidate (enabled) register 430 through a combinatorial logic 432 until reaching a register 434. The register 434 is a new candidate register that can be enabled by adding new combinatorial logic 436. However, there is a need to determine the enabled condition a register 434, in a previous clock cycle, respective of the enable of register 430. This is performed by tracing backwards in sequential logic that generates the enable signal and using a formal verification tool to find all possible states for the circuit in the previous clock cycle. Then, the new logic 436 can be derived by performing, for example, a union operation of all possible previous states. The register 434 is added to the output candidate list. Register 434 is also added to the input candidate list to allow further traversal backwards adding enables to previous levels of registers.

Figure 5:
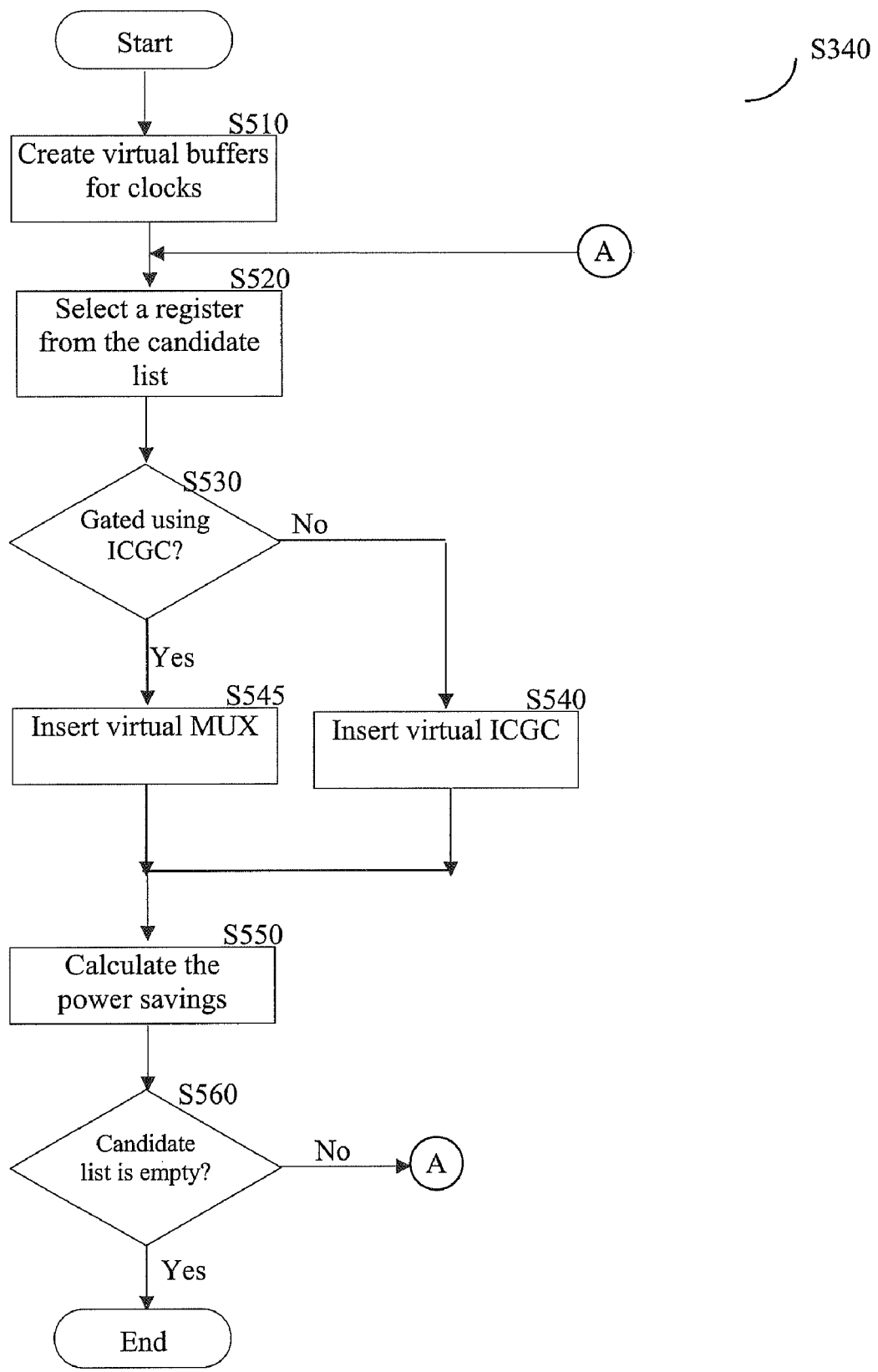
FIG. 5 is a detail flowchart describing the process for calculating the power savings for a candidate register.

At S340, for each register in either in the input or the output candidate list, the power savings is computed. Refer now to FIG. 5 where a detailed description of one implementation of step S340 is provided. It should be noted that the power computation is preferably performed prior to implementation and optimization of the design.

At S510, for each clock signal in the design a virtual buffer may be created. The virtual buffer is a virtual clock tree, which is an estimation of the power and area required by a real clock tree. The clock tree is inserted at a later stage in the design process by a clock tree synthesis tool. The fanout is the output terminals on a clock signal or the net attached to an output terminal. In case the number of registers on the clock net is low, then a normal buffer can drive the load and no virtual buffer is needed; the virtual buffer is required when the fanout is too high for a normal buffer to drive the load. The fanout limit beyond which a normal register can drive is given in the technology library. The technology library includes details on fabrication processes. The same design implemented in two different fabrication processes may have different power consumption and different clock gating tradeoffs. At S520, a single register is selected and removed from the candidate list. At S530 the gating technique that the designer utilized to gate the enable signal of the selected candidate register is determined. That is, the method checks, if the selected register has been gated by the designer using an ICGC or a multiplexer (MUX). As the objective of the method is to compute the difference in power between the two techniques, the method prepares to calculate a power savings for the selected register by inserting virtual logic. Specifically, the method continues with S540 to inset a virtual ICGC; otherwise, at S545 a virtual MUX is added to the circuit. It should be noted that the additional logic (MUXs, ICGCs, or virtual buffers) is added merely for the power computing and removed thereafter.

Figure 6:
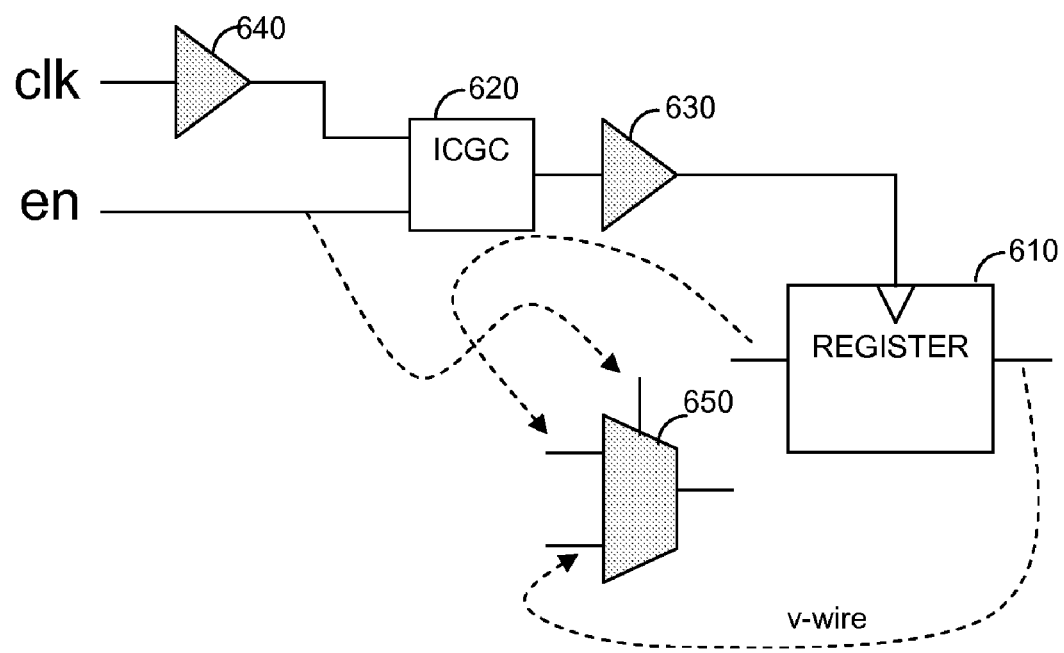
FIG. 6 is a resultant logic circuit which includes virtual logic instances.

As an example, FIG. 6 shows a circuit 600 that includes virtual logic inserted by the disclosed method. The original circuit includes a register 610 and an ICGC 620. The method inserts a virtual buffer 630 to the main clock signal and a virtual buffer 640 to the enabled clock. In addition, the method inserts a virtual MUX 650 for each register affected by the same enable signal.

At S550, the power savings (PS) for the selected candidate register is calculated. In accordance with one embodiment of the present invention the PS is determined according to the following equation:

$$PS = (DynGCV * ActClk\backslash ActEnab) + PwrVmux - PwrAnd;$$

where,
ActClk is the activity of clock signal (clk);
ActEnab is the activity of enabled clock;
DynGCV is the dynamic power of enabled clock virtual buffer (e.g., buffer 640);
PwrAnd is the total power of the ICGC; and
PwrVmux is total power of all virtual MUXes.

The activity of the clock and enable signal (ActClk and ActEnab) values are measured by reading input simulation data. The activity statistic is defined as the average number of times that a signal changes value during a simulation period, divided by the number of clock cycles in the simulation period. The DynGCV, PwrVmux, and PwrAnd values are the result of a power calculation process, which typically computes the power using a netlist, simulation data, and a power library. The power library is part of the technology library. The power calculation for the virtual MUX uses activity data of the input signals (d), output signals (q) and an enable signal of the candidate register.

At S560 a check is performed to determine if the input and output candidate lists are empty, i.e., if the power savings is computed for all registers in that list, and if so execution ends; otherwise, execution returns to S520 were another register from the list is selected.

Referring back to FIG. 3 where at S350 a report that includes the power savings for each register in the candidate lists is generated. An example for such a report is shown in FIG. 7. Registers in the output report may be sorted according to their gating power savings and registers having a power savings value below a predefined threshold are removed from the list. It would be apparent to a person skilled in the art that such report includes valuable information to the designer as in some cases gating the register increases the power consumption (i.e., negative power savings) and in some cases the gating is not worthwhile. At S360 a script for an implementation tool is generated. The script includes a set of commands with respect to clock gating implementation to use for each candidate register. For example, a script prevents the implementation tool from gating registers that increase the power (negative savings). It should be noted that a candidate register to be clock gated may be, but is not limited to, a register, a MUX, a tri-state bus, or a re-circulating register. The report and/or script may be output in human readable form in a printed medium, or output via a display unit, or output in the form of a file and stored in a memory for later retrieval.

It should be noted to a person skilled in the art that methods and processes described herein can be implemented in software, hardware, firmware, or combination thereof. The implementation may be performed as well using a computer system having a processor and a memory under control of the processor, the memory storing instructions adapted to enable the processor to carry out operations as described above. The implementation may be realized, in a concrete manner, as a computer program product that includes a tangible computer readable medium holding instructions adapted to enable a computer system to perform the operations as described above. The computer program product may optionally be a CAD program, and the computer system may optionally be a CAD system.

The foregoing exemplary embodiments, described in general terms above, are commended to the person familiar with this field. Those not familiar with this field may make recourse to the several helpful background references mentioned earlier in this description. The person familiar with this field will appreciate that the invention is more general than the concrete embodiments described above, and will find the scope of the invention to be described by the appended claims. In addition, the person familiar with this field will understand that various modifications may be made without departing from the scope and spirit of the invention, such as inserting steps in addition to those mentioned, performing the steps in various different orders or contemporaneously where possible, combining or omitting various steps, or the like.

There is claimed:

1. A method for computing power savings and determining a preferred clock gating circuit in an integrated circuit (IC) design comprising:
identifying candidate registers to be clock gated in the IC design;
inserting a virtual buffer for each clock signal in the IC design having a fanout greater than a predetermined fanout threshold;
computing the power savings for each candidate register; and
generating a report that includes the power savings for all the candidate registers,
wherein computing the power saving for each candidate register further comprises:
inserting virtual logic to cover every clock gating implementation; and calculating the power savings (PS) for each of implementation according to:

$$PS=(DynGCV*ActClk/ActEnab)+PwrVmux-PwrAnd.$$

2. The method of claim 1, further comprising generating, based on the report, a script for an implementation tool.

3. The method of claim 1, wherein identifying the candidate registers comprises tracing forward from an enabled register through a combinatorial logic until encountering a register.

4. The method of claim 1, wherein identifying the candidate registers comprises tracing backward from an enabled register through a combinatorial logic until encountering an input pin free of any external fanout.

5. The method of claim 4, wherein identifying the candidate registers comprises:
tracing backward from an enabled register through a combinatorial logic until encountering a register; and
enabling the register by inserting a logic that generates an enable condition for the register.

6. The method of claim 1, wherein the virtual logic includes at least one of: a virtual integrated clock gating circuit (ICGC) and a virtual multiplexer (MUX).

7. The method of claim 6, wherein the ActClk is the activity of a clock signal; the ActEnab is the activity of enabled clock; the DynGCV is dynamic power of an enabled clock virtual buffer; the PwrAnd is the total power of the virtual ICGC; and the PwrVmux is total power of virtual MUXes.

8. The method of claim 1, wherein the virtual MUX, the virtual ICGC, and the virtual buffers are removed after calculating the power savings.

9. The method of claim 1, wherein the power consumption of the candidate register is considered as being increased when a calculation indicates a negative value.

10. The method of claim 1, wherein the script comprises a set of commands adapted for use in implementing a clock gating circuit implementation, for each candidate register, having a greatest power savings value.

11. The method of claim 1, implemented in one of a computer aided design (CAD) system and a CAD program.

12. A non-transitory computer program product for computing power savings and determining a preferred clock gating circuit in an integrated circuit (IC) design, the computer program product having computer instructions on a tangible computer readable medium, the instructions being adapted to enable a computer system to perform operations comprising:
identifying candidate registers to be clock gated in the IC design;
inserting a virtual buffer for each clock signal in the IC design having a fanout that exceeds a predetermined threshold;
computing the power savings for each candidate register; and generating a report that includes the power savings for all the candidate registers,
wherein computing the power saving for each candidate register further comprises:
  inserting virtual logic to cover all clock gating implementations; and
  calculating the power savings (PS) using the formula:

$$PS = (DynGCV * ActClk/ActEnab) + PwrVmux - PwrAnd.$$

13. The computer program product of claim 12, wherein the operations further comprise generating, based on the report, a script for an implementation tool.

14. The computer program product of claim 12, wherein identifying the candidate registers comprises tracing forward from an enabled register through a combinatorial logic until encountering a register.

15. The computer program product of claim 12, wherein identifying the candidate registers comprises tracing backward from an enabled register through a combinatorial logic until encountering an input pin free of any external fanout.

16. The computer program product of claim 15, wherein identifying the candidate registers comprises:
  tracing backward from an enabled register through a combinatorial logic until encountering a register; and
  enabling the register by inserting a logic that generates an enable condition for the register.

17. The computer program product of claim 12, wherein the virtual logic includes at least one of: a virtual integrated clock gating circuit (ICGC) and a virtual multiplexer (MUX).

18. The computer program product of claim 17, wherein the ActClk is the activity of a clock signal; the ActEnab is the activity of enabled clock; the DynGCV is dynamic power of an enabled clock virtual buffer; the PwrAnd is the total power of the virtual ICGC; and the PwrVmux is total power of virtual MUXes.

19. The computer program product of claim 12, wherein the virtual MUX, the virtual ICGC and the virtual buffers are removed after calculating the power savings.

20. The computer program product of claim 12, wherein the power consumption of the candidate register is considered as increased when a calculation results with a negative value.

21. The computer program product of claim 12, wherein the script comprises a set of commands adapted for use in implementation of the clock gating circuit, for each candidate register, having a greatest power savings value.

22. The computer program product of claim 12, implemented in one of a computer aided design (CAD) system and a CAD program.

* * * * *